United States Patent [19]
Hasebe et al.

[11] Patent Number: 5,537,963
[45] Date of Patent: Jul. 23, 1996

[54] VALVE OPERATING SYSTEM FOR MULTI-CYLINDER INTERNAL COMBUSTION ENGINE

[75] Inventors: Tetsuya Hasebe; Kazuhide Kumagai, both of Saitama, Japan

[73] Assignee: Honda Giken Kogyo Kabushiki Kaisha, Tokyo, Japan

[21] Appl. No.: 483,479

[22] Filed: Jun. 7, 1995

[30] Foreign Application Priority Data

Sep. 2, 1994 [JP] Japan .................................. 6-210028

[51] Int. Cl.⁶ .............................. F02D 13/06; F01L 13/00
[52] U.S. Cl. .................................... 123/90.16; 123/198 F
[58] Field of Search ............................. 123/90.15, 90.16, 123/90.17, 198 F

[56] References Cited

FOREIGN PATENT DOCUMENTS 2-24888  7/1990  Japan .
2-50284  11/1990  Japan .

*Primary Examiner*—Weilun Lo
*Attorney, Agent, or Firm*—Lyon & Lyon

[57] ABSTRACT

A valve operating system in a multi-cylinder internal combustion engine, including an intake valve and an exhaust valve valve operating/stopping switch-over device capable of switching over the operation and non-operation or stoppage of an intake valve and an exhaust valve, respectively. Each valve operating/stopping switch-over device includes a hydraulic pressure chamber for exhibiting a hydraulic pressure force in one axial direction and a return spring for exhibiting a spring force in the other axial direction for opposing the hydraulic pressure force, so that the operation and stoppage of the intake and exhaust valves is switched over from one to another by controlling the hydraulic pressure applied to the hydraulic pressure chambers. A single hydraulic pressure control valve is connected commonly to the hydraulic pressure chambers in the intake valve and exhaust valve operating/stopping switch-over device. In one embodiment, spring loads of the return springs are set at values different from each other, and in another embodiment, the single hydraulic pressure control operates sequentially, for both embodiments to cause sequential operation of the intake and exhaust switch-over devices.

3 Claims, 12 Drawing Sheets

VALVE OPERATING SYSTEM FOR MULTI-CYLINDER INTERNAL COMBUSTION ENGINE

BACKGROUND OF THE INVENTION

1. Field of the Invention

The present invention relates to a valve operating system for a multi-cylinder internal combustion engine, and particularly, to a valve operating system in a multi-cylinder internal combustion engine having an intake and exhaust valve operating (hereinafter also referred to as "operating/stopping") switch-over means capable of switching over the operation and non-operation or stoppage of an intake and exhaust valve for at least one of a plurality of cylinders, with each of the valve operating/stopping switch-over means including means for causing operation in response to a hydraulic pressure.

2. Description of the Prior Art

A valve operating system in which in at least one of a plurality of cylinders, an intake valve is closed and stopped for bringing the cylinder into its non-operating or stopped state is conventionally known, for example, from Japanese Utility Model Publication No. 24888/90 and Japanese Patent Publication No. 50284/90.

It is necessary not only to close and stop the intake valve, but also to close and stop the exhaust valve when the cylinder is inoperative or stopped. For this purpose, a valve operation and stoppage switch-over means may be provided for each of the intake and exhaust valves of a cylinder. However, to avoid combustion gas remaining within the stopped cylinder, when the cylinder is stopped, it is necessary to stop the intake valve prior to stoppage of the exhaust valve. On the other hand, if air is supplied into and retained in the cylinder in a condition in which the supplying of fuel has been cut, it is possible to prevent the escape of oil. In this case, it is necessary to stop the intake valve prior to stoppage of the exhaust valve. When the valve operation and stoppage switch-over means is of a hydraulically operated type, in order to provide a time difference between the stoppage of the intake valve and the stoppage of the exhaust valve, when the cylinder is stopped, hydraulic pressure control valves may be connected independently to the valve operation and stoppage switch-over means for the intake and exhaust valves, respectively, so that the operation of the hydraulic pressure control valves are controlled with a time difference. However, then two hydraulic pressure control valves are required, resulting not only in an increase in number of parts, but also in an increased space for disposition of the hydraulic pressure control valves.

SUMMARY OF THE INVENTION

Accordingly, it is an object of the present invention to provide a valve operating system for a multi-cylinder internal combustion engine, in which a time lag is produced in a switching operation between intake and exhaust valve operating/stoppage switch-over means by using a single hydraulic control valve, thereby decreasing the number of parts and reducing the space required for disposition of the hydraulic pressure control valve.

To achieve the above object, according to the present invention, there is provided a valve operating system in a multi-cylinder internal combustion engine, including an intake valve operating/stopping switch-over device capable of switching over the operation and non-operation or stoppage of an intake valve and an exhaust valve operating/stopping switch-over device capable of switching over the operation and non-operation or stoppage of an exhaust valve, the intake and exhaust valve operating/stopping switch-over devices being provided for at least one of a plurality of cylinders, each valve operating/stopping switch-over device including a hydraulic pressure chamber capable of exhibiting a hydraulic pressure force in one axial direction and a return spring for exhibiting a spring force in the other axial direction for opposing the hydraulic pressure force, so that the operation and stoppage of the intake and exhaust valves being capable of being switched over from one to another is in response to the control of a hydraulic pressure applied to the hydraulic pressure chambers, wherein the valve operating system further includes a single hydraulic pressure control valve which is connected commonly to the hydraulic pressure chambers in the intake and exhaust valve operating/stopping switch-over devices, and the spring loads of the return springs of the intake and exhaust valve operating/stopping switch-over devices are set at values different from each other.

With this arrangement, even if the hydraulic pressures in both the hydraulic pressure chambers are identical to each other, since the spring loads of both the return springs are different, a time lag is produced in a switching operation between the intake valve operating/stopping devices, as well in a switching operation between the exhaust valve operating/stopping device. This contributes to a reduction of the number of parts and a reduction in the space required for disposition of the hydraulic pressure control valve.

Further, according to another feature of the invention, there is provided a valve operating system in a multi-cylinder internal combustion engine, comprising an intake valve operating/stopping switch-over means capable of switching over the operation and stoppage of an intake valve and an exhaust valve operating/stopping switch-over means capable of switching over the operation and stoppage of an exhaust valve, the intake and exhaust operating/stopping switch-over means being provided for at least one of a plurality of cylinders, each of the valve operating/stopping switch-over means including a hydraulic pressure chamber capable of exhibiting a hydraulic pressure force in one axial one direction, and a return spring for exhibiting a spring force in the other axial direction for opposing the hydraulic pressure force, so that the operation and stoppage of the intake and exhaust valves being capable of being switched over from one to another is in response to the control of a hydraulic pressure applied to the hydraulic pressure chambers, wherein the hydraulic chambers in the intake and exhaust valve operating/stopping switch-over means are connected commonly to a single hydraulic pressure control valve for sequentially controlling the hydraulic pressures of both the hydraulic chambers in response to a changing of a stroke amount of a valve spool in one direction.

Also with this arrangement, even if the hydraulic pressures in both the hydraulic pressure chambers are identical to each other, since the spring loads of both the return springs are different, a time lag is produced in a switching operation between the intake valve operating/stopping means, as well in a switching operation between the exhaust valve operating/stopping means. This contributes to a reduction of the number of parts and a reduction in the space required for disposition of the hydraulic pressure control valve.

The above and other objects, features and advantages of the invention will become apparent from preferred embodiments taken in conjunction with the accompanying drawings.

BRIEF DESCRIPTION OF THE DRAWINGS

FIGS. 1 to 7 illustrate a first embodiment of the present invention, wherein

FIG. 1 is a vertical sectional side view of an internal combustion engine;

FIG. 2 is a view taken along a line 2—2 in FIG. 1;

FIG. 3 is a sectional view taken along a line 3—3 in FIG. 2;

FIG. 4 is a sectional view taken along a line 4—4 in FIG. 2;

FIG. 5 is a sectional view taken along a line 5—5 in FIG. 2;

FIG. 6 is a sectional view taken along a line 6—6 in FIG. 2; and

FIG. 7 is a view of a hydraulic pressure circuit showing a connected state between both operating/stoppage switch-over means and a hydraulic control valve.

FIGS. 8 to 12 illustrate a second embodiment of the invention, wherein

FIG. 8 is a view of a hydraulic pressure circuit corresponding to FIG. 7;

FIG. 9 is a vertical sectional view of a hydraulic pressure control valve in a state with a stroke amount of zero;

FIG. 10 is a vertical sectional view of the hydraulic pressure control valve in a state with a stroke amount of $S_1$;

FIG. 11 is a vertical sectional view of the hydraulic pressure control valve in a state with a stroke amount equal to or greater than $S_1$ and less than $S_2$; and FIG. 12 is a vertical sectional view of the hydraulic pressure control valve in a state with a stroke amount of $S_2$.

DESCRIPTION OF THE PREFERRED EMBODIMENTS

Figure 1:
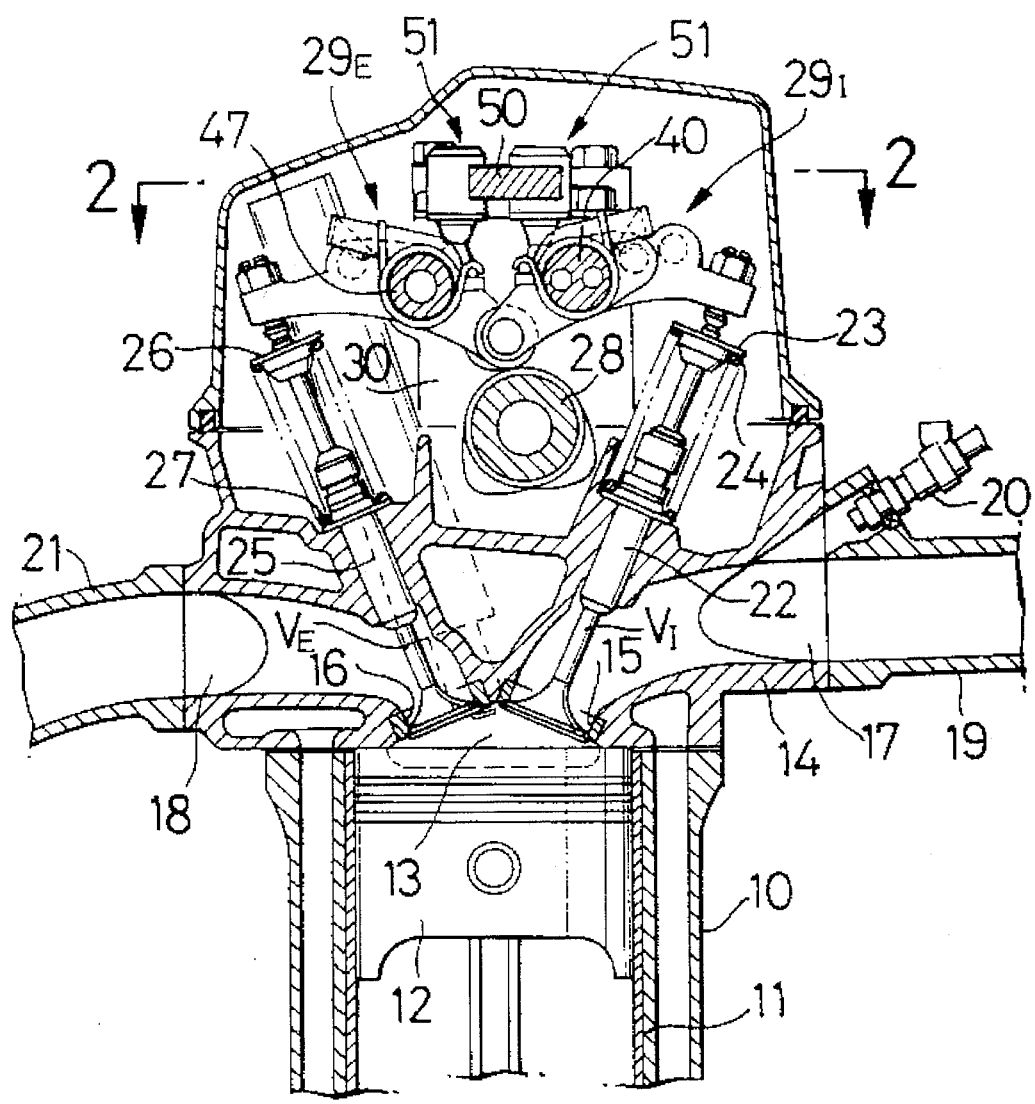

The present invention will now be described by way of an embodiment which is applied to an SOHC type multi-cylinder internal combustion engine in connection with the accompanying drawings. Referring first to FIG. 1, a plurality of cylinders 11 are provided in parallel in a cylinder block 10 of the SOHC type internal combustion engine, and a piston 12 is slidably received in each of the cylinders 11. A cylinder head 14 is coupled to an upper surface of the cylinder block 10 to define combustion chambers 13 between the cylinder head itself and the pistons 12. A pair of intake valve bores 15 and a pair of exhaust valve bores 16 are provided in the cylinder head 14 for each cylinder 11, so that they open into a ceiling surface of each of the combustion chambers 13. The intake valve bores 15 are in communication with intake ports 17 which open into one side of the cylinder head 14, and the exhaust valve bores 16 are in communication with exhaust ports 18 which open into the other side of the cylinder head 14. Fuel injection valves 20 for injecting fuel toward the intake ports 17 are mounted to an intake manifold 19 which is connected to the cylinder head 14 through the intake ports 17, and an exhaust manifold 21 leading to the exhaust ports 18 is connected to the cylinder head 14.

Figure 2:
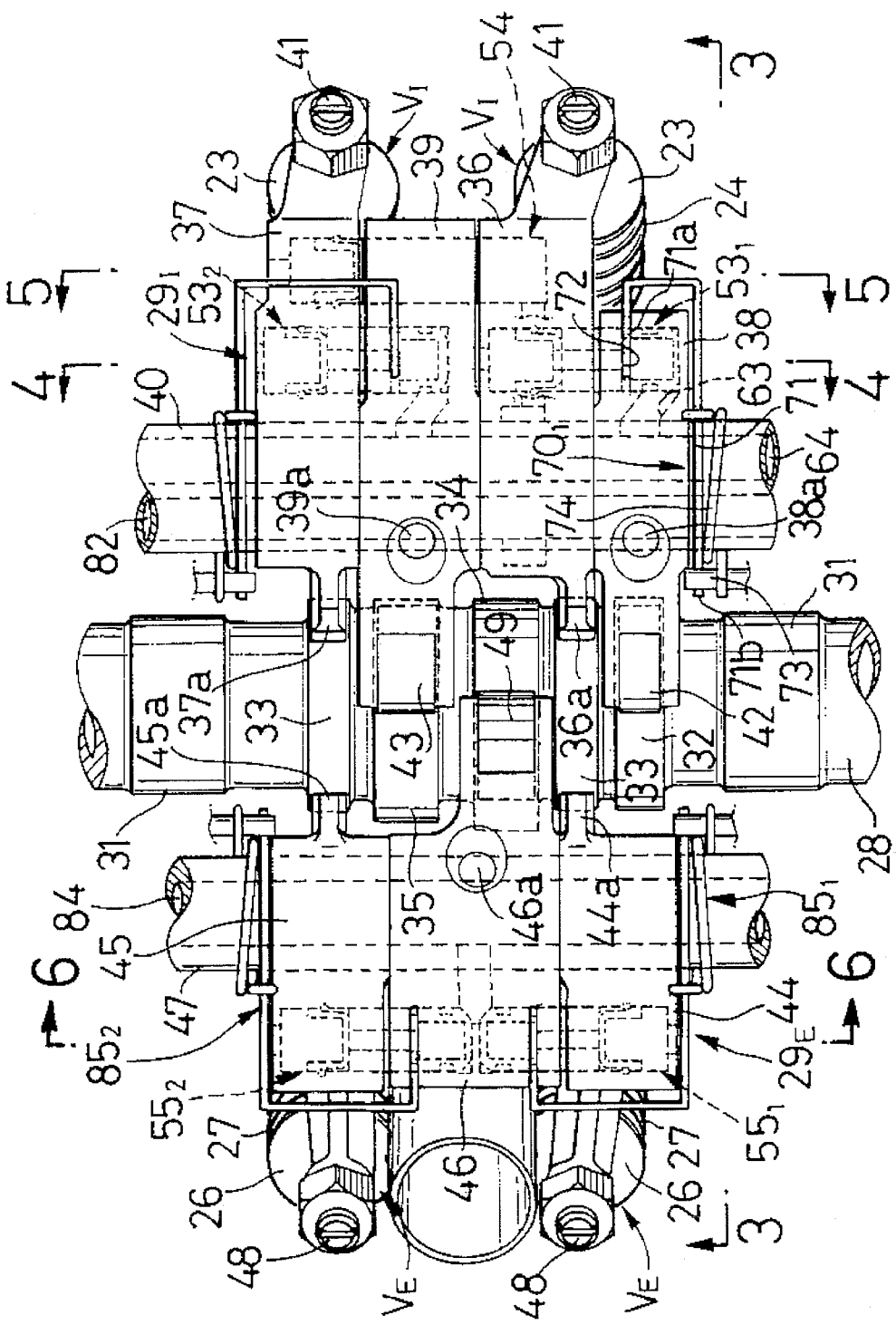

Referring also to FIG. 2, a pair of intake valves $V_I$, $V_I$ capable of independently opening and closing the intake valve bores 15 are slidably fitted in guide sleeves 22 provided in the cylinder head 14 at a location corresponding to each of the cylinders 11 capable of being rendered inoperative or stopped. Valve springs 24 surrounding the intake valves $V_I$, $V_I$ are compressed between the cylinder head 14 and retainers 23, 23 mounted at the upper ends of the intake valves $V_I$, $V_I$ which protrude upwardly from the guide sleeves 22. The intake valves $V_I$, $V_I$ are biased by the valve springs 24 in the direction to close the intake valve bores 15. A pair of exhaust valves $V_E$, $V_E$ capable of independently opening and closing the exhaust valve bores 16 are slidably fitted in guide sleeves 25 provided in the cylinder head 14. Valve springs 27 surrounding the exhaust valves $V_E$, $V_E$ are compressed between the cylinder head 14 and retainers 26, 26 provided at the upper ends of the exhaust valves $V_E$, $V_E$ which protrude upwardly from the guide sleeves 25. The exhaust valves $V_E$, $V_E$ are biased by the valve springs 27 in the direction to close the exhaust valve bores 16.

In at least one of the cylinders 11, both the intake valves $V_I$, $V_I$ and both the exhaust valves $V_E$, $V_E$ can be switched over between an operating state and a inoperative stopped state. Description will be made hereinafter for those corresponding to such a cylinder 11 in which the operating state and the stopped state can be switched over.

Figure 3:
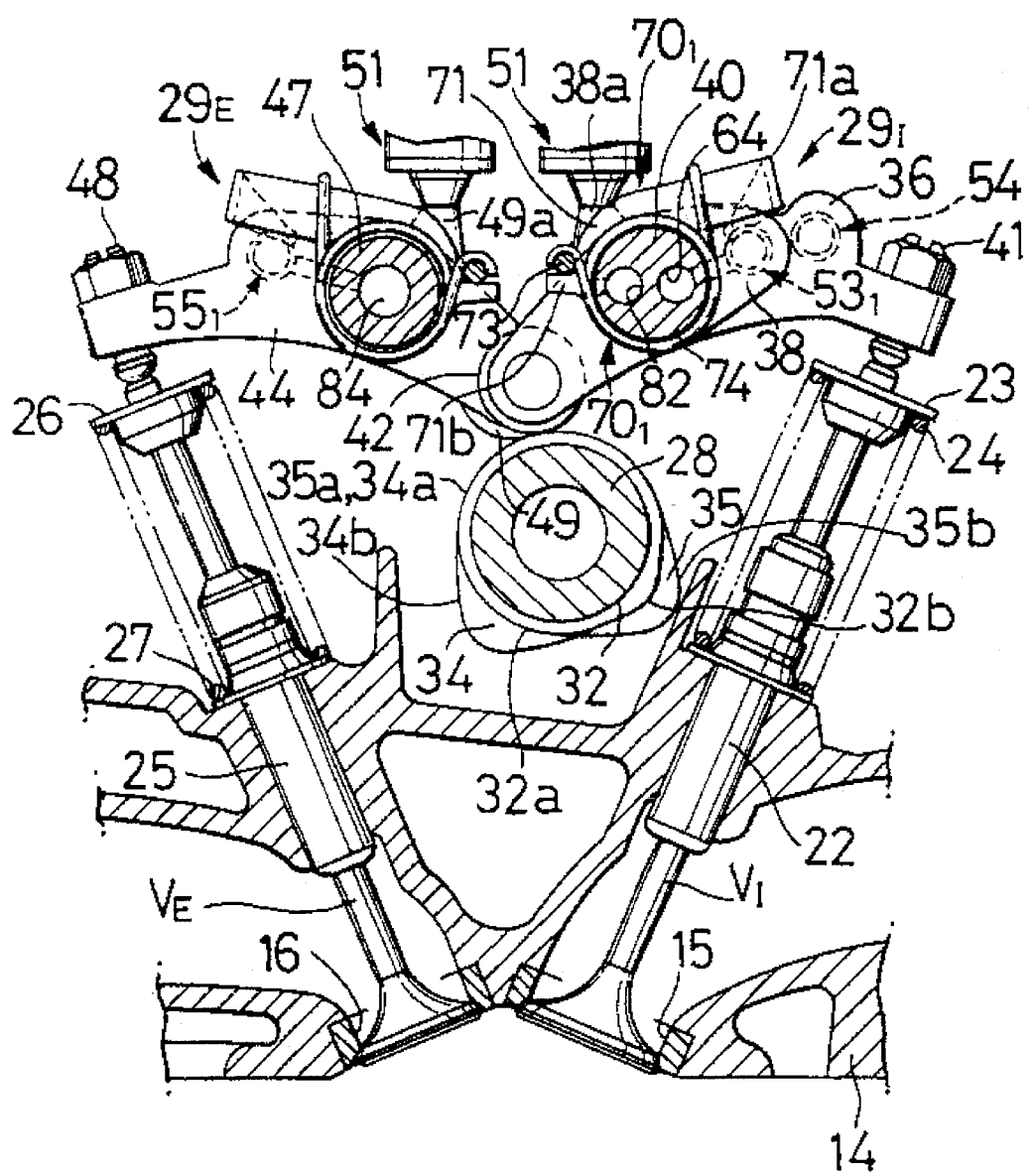

Referring also to FIG. 3 in combination, an intake valve operating device $29_I$ is provided between the intake valves $V_I$, $V_I$ and a cam shaft 28 operatively connected to a crankshaft (not shown) at a reduction ratio of 1/2 for converting the rotational motion of the cam shaft 28 into the opening and closing motions of the intake valves $V_I$, $V_I$. An exhaust valve operating device $29_E$ is provided between the exhaust valves $V_E$, $V_E$ and the cam shaft 28 for converting the rotational motion of the cam shaft 28 into the opening and closing motions of the exhaust valves $V_E$, $V_E$.

The cam shaft 28 has an axis parallel to an axis of rotation of the crankshaft and is rotatably carried by the cylinder head 14 and a holder 30 coupled to the cylinder head 14. Cam journal portions 31, 31 are provided at a distance axially spaced from each other on the cam shaft 28 and rotatably carried between the cylinder head 14 and the holder 30. The cam shaft 28 has a low lift cam 32, a circular (valve non-operating or stopping) portion 33, an exhaust valve operating cam 34, an intake valve operating cam 35 and a stopping portion 33, which are integrally provided thereon at locations sequentially spaced from each other, in that order, between one of the cam journal portions 31 and the other cam journal portion 31.

The intake valve operating cam 35 has a profile capable of opening the intake valves $V_I$, $V_I$ and includes a base-circle portion 35a which is circular about the axis of the cam shaft 28, and a cam lobe 35b protruding radially outwardly from the base-circle portion 35a. The low lift cam 32 has a mostly circular profile capable of substantially stopping the operation of one intake valve $V_I$, but slightly opening that intake valve $V_I$ during its valve opening timing, and includes a base-circle portion 32a which is circular about the axis of the cam shaft 28, and a cam lobe 32b slightly protruding radially outwardly from the base-circle portion 32a. The circular or valve-stopping portion 33 is formed into a circular shape about the axis of the cam shaft 28 with the same radius as the base-circle portions 35a and 32a of the intake valve operating cam 35 and the low lift cam 32.

The exhaust valve operating cam 34 has a profile capable of opening the exhaust valve $V_I$ and includes a base-circle portion 34a which is circular about the axis of the cam shaft 28, and a cam lobe 34b protruding radially outwardly from the base-circle portion 34a.

Figure 4:
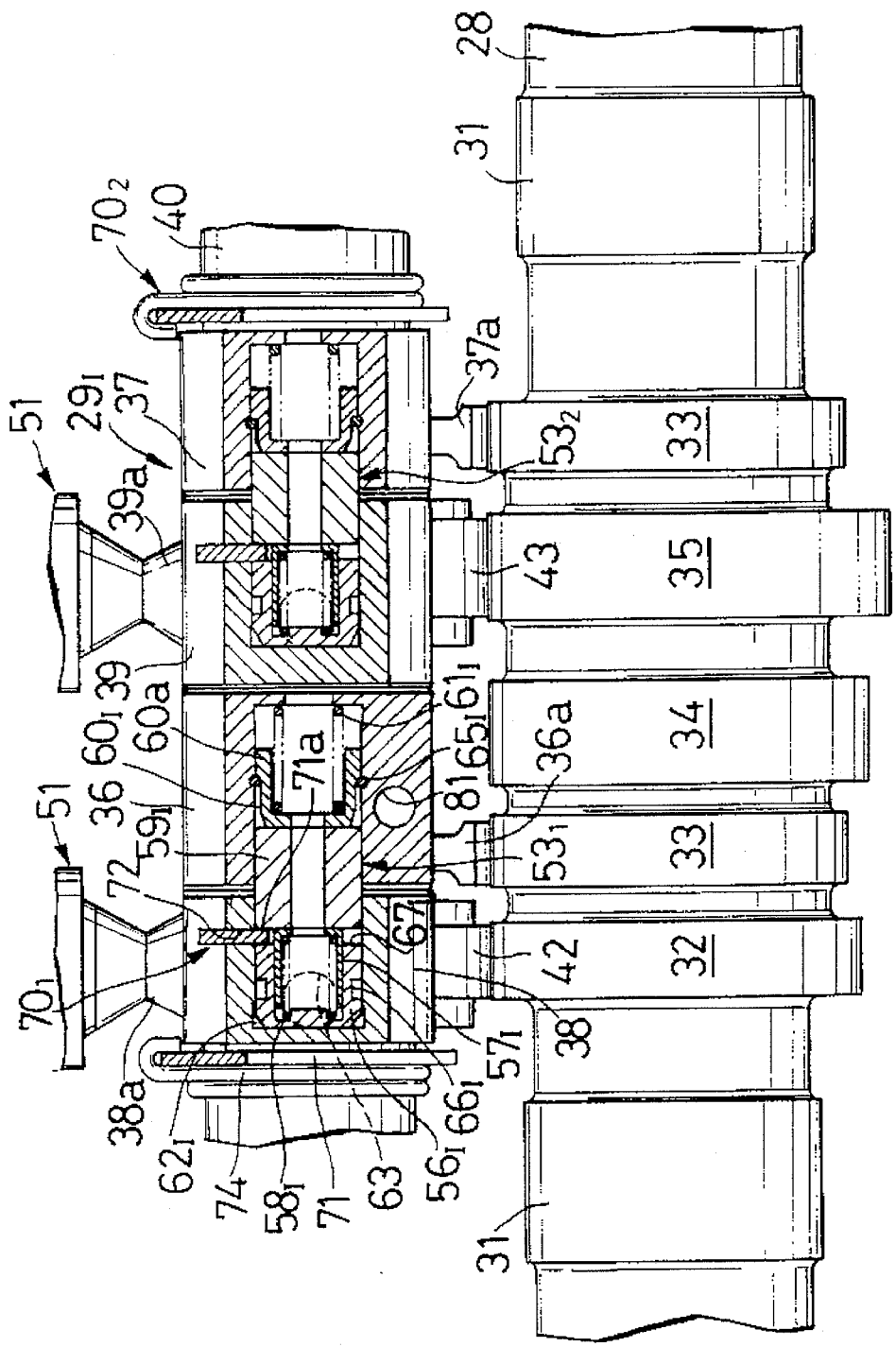
Figure 5:
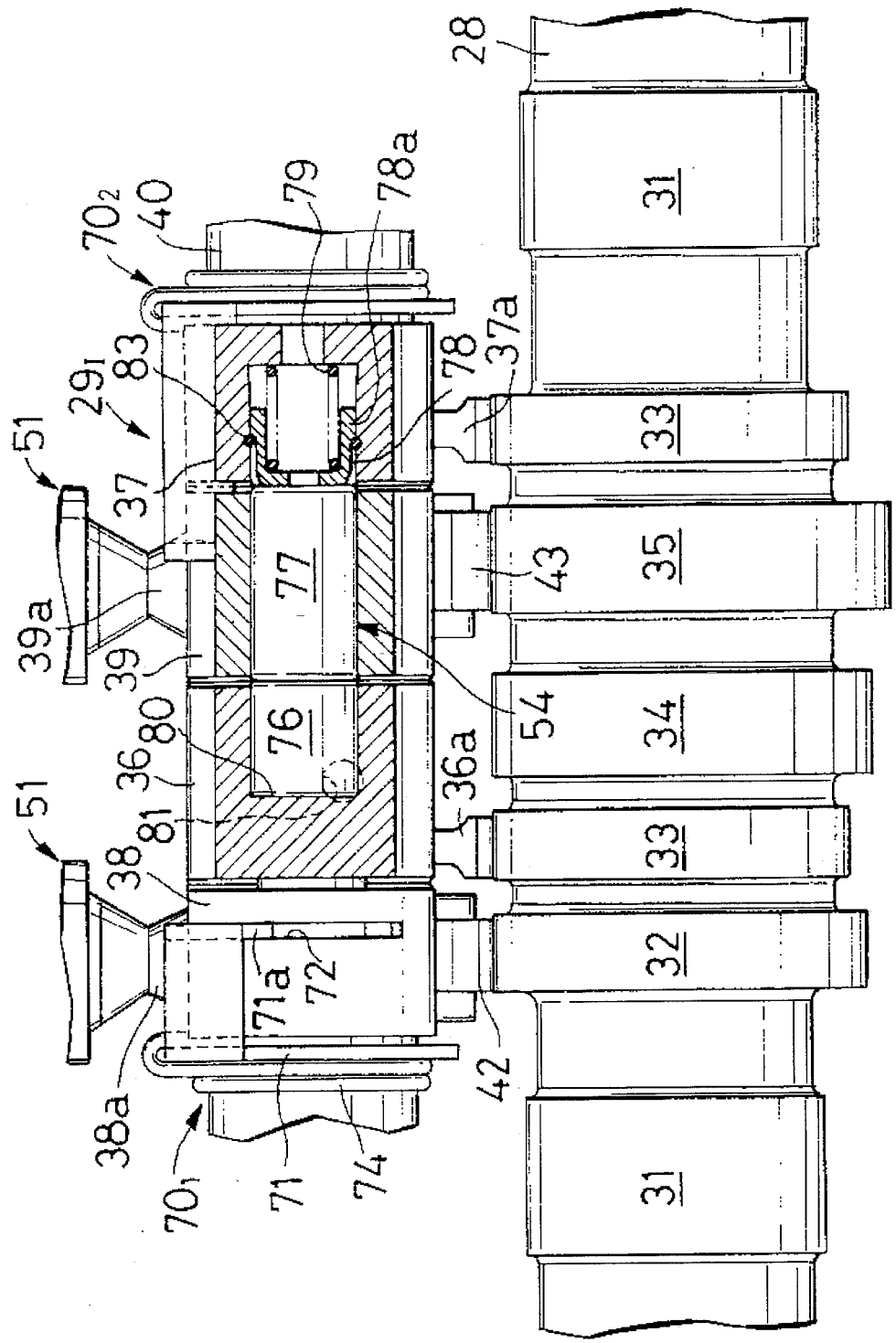

Referring also to FIGS. 4 and 5, the intake valve operating device $29_I$ includes first and second intake valve driving rocker arms 36 and 37, and first and second intake valve free rocker arms 38 and 39. The rocker arms 36 to 39 are swingably carried on an intake valve rocker shaft 40 which is fixedly supported by the holder 30 at a location laterally above the cam shaft 28.

Tappet screws 41, 41 are threadedly fitted in one end of each of the first and second intake valve driving rocker arms 36 and 37 to abut against upper ends of the intake valves $V_I$, $V_I$, so that their advanced positions can be adjusted. The first and second intake valve driving rocker arms 36 and 37 are provided at the other ends with abutment portions 36a and 37a which abut against the circular portions 33, 33 of the cam shaft 28. The second intake valve free rocker arm 39 is disposed between the intake valve driving rocker arms 36 and 37, and the first intake valve free rocker arm 38 is disposed on the opposite side of the first intake valve driving rocker arm 36 from the second intake valve free rocker arm 39. A roller 42 is supported by a pin on the first intake valve free rocker arm 38 to come into rolling contact with the low lift cam 32, and a roller 43 is supported by a pin on the second intake valve free rocker arm 39 to come into rolling contact with the intake valve operating cam 35.

The exhaust valve operating device $29_E$ includes first and second exhaust valve driving rocker arms 44 and 45, and an exhaust valve free rocker arm 46. The rocker arms 44 to 46 are swingably carried on an exhaust valve rocker arm shaft 47 which is fixedly supported by the holder 30 at a location laterally above the cam shaft 28.

Tappet screws 48, 48 are threadedly fitted in one end of each of the first and second exhaust valve driving rocker arms 44 and 45 to abut against upper ends of the exhaust valves $V_E$, $V_E$, so that their advanced positions can be adjusted. The first and second exhaust valve driving rocker arms 44 and 45 are provided at the other ends with abutment portions 44a and 45a which abut against the circular portions 33, 33 of the cam shaft 28. The exhaust valve free rocker arm 46 is disposed between the exhaust valve driving rocker arms 44 and 45, and a roller 49 is supported by a pin on the exhaust valve free rocker arm 46 to come into rolling contact with the exhaust valve operating cam 34.

A support plate 50 is fixed on the holder 30 above the intake valve rocker arms 36 to 39 as well as the exhaust valve-side rocker arms 44 to 46, and lost motion mechanisms 51 are mounted on the support plate 50 in correspondence to the first and second intake valve free rocker arms 38 and 39 of the intake valve operating device $29_I$ as well as the exhaust valve free rocker arm 46 of the exhaust valve operating device $29_E$, respectively. Each of the lost motion mechanisms 51 has a spring (not shown) therein. The first and second intake valve free rocker arms 38 and 39 and the exhaust valve free rocker arm 46 have abutment projections 38a, 39a and 46a provided respectively at upper portions thereof to abut against the corresponding lost motion mechanisms 51. Thus, the first and second intake valve free rocker arms 38 and 39 are resiliently biased by a spring force exhibited by the lost motion mechanism 51 in a direction to abut against the low lift cam 32 and the intake valve operating cam 35, respectively, and the exhaust valve free rocker arm 46 is resiliently biased by a spring force exhibited by the lost motion mechanism 51 in a direction to abut against the exhaust valve operating cam 34.

In the intake valve operating device $29_I$, a first intake valve operating/stoppage switch-over means $53_1$ capable of switching over an operating state and a non-operating or stopped state of one of the intake valves $V_I$ is provided in the first intake valve driving rocker arm 36 and the first intake valve free rocker arm 38 and is capable of switching over the connection and disconnection of these rocker arms 36 and 38. A second intake valve operating/stoppage switch-over means $53_2$ capable of switching over an operating state and a non-operating state of the other intake valve $V_I$ is provided in the second intake valve driving rocker arm 37 and the second intake valve free rocker arm 39 and is capable of switching over the connection and disconnection of these rocker arms 37 and 39. A connection switch-over means 54 is provided in the first intake valve driving rocker arm 36, the second intake valve driving rocker arm 37 and the second intake valve free rocker arm 39 and is capable of switching over the connection and disconnection of these rocker arms 36, 37 and 39. In the exhaust valve operating device $29_E$, a first exhaust valve operating/stoppage switch-over means $55_1$ capable of switching over an operating state and a non-operating or stopped state of one of the exhaust valves $V_E$ is provided in the first exhaust valve driving rocker arm 44 and the exhaust valve free rocker arm 46 and is capable of switching over the connection and disconnection of these rocker arms 44 and 46. A second exhaust valve operating/stoppage switch-over means $55_2$ capable of switching over an operating state and a non-operating state of the other exhaust valve $V_E$ is provided in the second exhaust valve driving rocker arm 45 and the exhaust valve free rocker arm 46 and is capable of switching over the connection and disconnection of these rocker arms 45 and 46.

Referring to FIG. 4, the first intake valve operating/stoppage switch-over means $53_1$ provided between the first intake valve driving rocker arm 36 and the first intake valve free rocker arm 38 includes a piston $56_I$ slidably received in the first intake valve free rocker arm 38, an urging pin $57_I$ slidably received in the piston $56_I$, a spring $58_I$ mounted under compression between the piston $56_I$ and the urging pin $57_I$, a switch-over pin $59_I$ abutting against the urging pin $57_I$, a limiting member $60_I$ slidably fitted in the first intake valve driving rocker arm 36 to abut against the switch-over pin $59_I$ on the opposite side from the urging pin $57_I$, and a return spring $61_I$ mounted under compression between the limiting member $60_I$ and the first intake valve driving rocker arm 36. The return spring $61_I$ has a preset load set larger than a preset load of the spring $58_I$.

The piston $56_I$ is formed in a bottomed cylindrical shape with one end closed, and a hydraulic pressure chamber $62_I$ is defined between the closed end of the piston $56_I$ and the first intake valve free rocker arm 38. A communication passage 63 is provided in the first intake valve free rocker arm 38 to lead to the hydraulic pressure chamber $62_I$ and is normally in communication with an oil passage 64 which is provided within the intake valve rocker arm shaft 40.

The urging pin $57_I$ is formed in a bottomed cylindrical shape having an outside diameter which permits the urging pin $57_I$ to be fitted into the piston $56_I$. The urging pin is slidably fitted in the piston $56_I$, so that its opened end is opposed to the closed end of the piston $56_I$. The spring $58_I$ is mounted under compression between the closed end of the piston $56_I$ and a closed end of the urging pin $57_I$.

The switch-over pin $59_I$ is slidable between a position in which it is fitted across the boundary between the first intake valve free rocker arm 38 and the first intake valve driving rocker arm 36, as shown in FIG. 4, and a position in which it is fitted in the first intake valve driving rocker arm 36 in such a manner that its face abutting against the urging pin $57_I$ corresponds to the boundary between the first intake valve driving rocker arm 36 and the first intake valve free rocker arm 38.

The limiting member $60_I$ is formed in a bottomed cylindrical shape with one closed end abutting against the switch-over pin $59_I$. The limiting member $60_I$ is provided at the other end with a collar portion $60a$ which protrudes radially outwardly from the limiting member $60_I$ and is slidably fitted in the first intake valve driving rocker arm 36. A retaining ring $65_I$ is fitted in the first intake valve-side driving rocker arm 36 which abuts against the collar portion $60a$ of the limiting member $60_I$ to limit the movement of the limiting member $60_I$ toward one end, i.e., toward the switch-over pin $59_I$.

The axial length of each of the switch-over pin $59_I$ and the limiting member $60_I$ is set such that when the limiting member $60_I$ has been moved to a position in which the movement is limited by the retaining ring $65_I$, the switch-over pin $59_I$ extends across the boundary between the first intake valve driving rocker arm 36 and the first intake valve free rocker arm 38 to connect the rocker arms 36 and 38 to each other, but when the limiting member $60_I$ has been moved while compressing the return spring $61_I$ to a position in which the open end of the limiting member $60_I$ abuts against the first intake valve driving rocker arm 36, the face of the switch-over pin $59_I$ abutting against the urging pin $57_I$ is located at the position corresponding to the boundary between the rocker arms 36 and 38 to disconnect the rocker arms 36 and 38. On the other hand, the piston $56_I$ and the urging pin $57_I$ are slidably fitted in the first intake valve-side free rocker arm 38 in such a manner that they are urged axially away from each other by a spring force of the spring $58_I$ in a condition in which a portion of the switch-over pin $59_I$ has been fitted in the first intake valve-side free rocker arm 38, as shown in FIG. 4.

An annular engagement groove $66_I$ is provided around an outer periphery of the piston $56_I$. When the piston $56_I$ and the urging pin $57_I$ are in their states in which they extend away from each other, as shown in FIG. 4, an annular engagement groove $67_I$ is defined around the urging pin $57_I$ between the piston $56_I$ and the switch-over pin $59_I$.

A trigger mechanism $70_I$ is provided in combination with the first intake valve-side valve operating/stoppage switch-over means $53_1$ for limiting the timing of operation of the first intake valve-side valve operating/stoppage switch-over means $53_1$. The trigger mechanism $70_1$ includes a trigger plate 71 which is swingable relative to the rocker arms 36 and 38 about an axis of the intake valve-side rocker arm shaft 40 between a position in which the trigger mechanism $70_1$ is engaged with the engagement groove $66_I$ in the piston $56_I$ or the engagement groove $67_I$ between the piston $56_I$ and the switch-over pin $59_I$ to limit the movement of the piston $56_I$, and a position in which the trigger mechanism $70_1$ is disengaged from the engagement groove $66_I$ or 67 to permit the movement of the piston 57.

A slit 72 is provided in the first intake valve free rocker arm 38, so that the slit 72 is located at a position corresponding to the engagement groove $67_I$ in a condition in which the piston $56_I$ has been displaced to the maximum toward the hydraulic pressure chamber $62_I$, as shown in FIG. 4. The engagement groove $66_I$ is provided around the outer periphery of the piston $56_I$, so that the engagement groove $66_I$ is located at a position corresponding to the slit 72 in a condition in which the piston $56_I$ and the urging pin $57_I$ abutting against each other have been moved to a position in which the volume of the hydraulic pressure chamber $62_I$ is maximized.

The trigger plate 71 is turnably carried on the intake valve rocker arm shaft 40. The trigger plate 71 is integrally provided with an engagement plate portion $71a$ which is disengageably engaged with the engagement groove $66_I$ or $67_I$ through the slit 72.

A stopper pin 73 is fixedly mounted in the cylinder head 14 to extend toward the first intake free rocker arm 38, and a stopper $71b$ is projectingly provided on the trigger plate 71 and is capable of abutting against the stopper pin 73 from below. A torsional spring 74 surrounding the intake valve rocker arm shaft 40 is locked at one end to the stopper pin 73 and at the other end to the trigger plate 71 from above. Thus, the trigger plate 71 is biased by a force of the torsional spring 74 in a direction to bring the stopper $71b$ into abutment against the stopper pin 73. The position of the stopper pin 73 is established, so that when the first intake valve free rocker arm 38 is in its stopped state in abutment against the base-circle portion $32a$ of the low lift cam 32 in a condition in which the stopper $71b$ is in abutment against the stopper pin 73, the engagement plate portion $71a$ of the trigger plate 71 can be brought into engagement with the engagement groove $66_I$ or $67_I$ through the slit 72, and when the first intake valve free rocker arm 38 is swung in a valve-closing direction by the cam lobe $32b$ of the low lift cam 32, the engagement plate portion $71a$ is disengaged from the slit 72.

With the above-described first intake valve valve operating/stoppage switch-over means $53_1$ and the trigger mechanism $70_1$, in a condition in which the hydraulic pressure in the hydraulic pressure chamber $62_I$ has been released, the switch-over pin $59_I$ is located at the position in which it extends across the boundary between the first intake valve driving rocker arm 36 and the first intake valve free rocker arm 38 to connect the rocker arms 36 and 68 to each other. In this case, the engagement plate portion $71a$ of the trigger plate 71 in the trigger mechanism $70_1$ is in disengagement from the engagement groove $67_I$, when the first intake valve free rocker arm 38 has been pushed down by the cam lobe $32b$ of the low lift cam 32, and the engagement plate portion $71a$ is in engagement with the engagement groove $67_I$, when the first intake valve free rocker arm 38 is in its stopped state in sliding contact with the base-circle portion $32a$ of the low lift cam 32.

If a hydraulic pressure is then applied to the hydraulic pressure chamber $62_I$, the piston $56_I$ is moved while compressing the spring $58_I$, until it abuts against the switch-over pin $59_I$, while the engagement plate portion $71a$ is disengaged from the engagement groove. But the switch-over pin $59_I$ is in its state in which it is located across the boundary between the first intake valve driving rocker arm 36 and the first intake valve free rocker arm 38 to connect the rocker arms 36 and 38 to each other, so that a force in a shearing direction is applied to the switch-over pin $59_I$. Therefore, the piston $56_I$ is inhibited from being moved to cause the switch-over pin $59_I$ to be forced into the first intake valve operating rocker arm 36. However, when the first intake valve free rocker arm 38 starts to be brought into sliding contact with the base-circle portion $32a$ of the low lift cam 32, so that the force in the shearing direction on the switch-over pin $59_I$ has been decreased, the piston $56_I$ is moved until it forces the switch-over pin $59_r$ into the first intake valve driving rocker arm 36, thereby releasing the connection of the rocker arms 36 and 38 to each other.

In a condition in which the connection of the rocker arms 36 and 38 to each other has been released in this manner, the engagement plate portion $71a$ of the trigger plate 71 in the trigger mechanism $70_1$ is disengaged from the engagement groove $66_r$, when the first intake valve free rocker arm 38 has been pivoted by the cam lobe 32b of the substantially stopping cam 32, and the engagement plate portion 71a is in engagement with the engagement groove $66_r$, when the first intake valve free rocker arm 38 is in its state in sliding contact with the base-circle portion 32a of the low lift cam 32. When the hydraulic pressure in the hydraulic pressure chamber $62_r$ has been released to connect the rocker arms 36 and 38 to each other, the piston $56_r$ is moved by the spring force of the spring $58_r$ to a position to minimize the volume of the hydraulic pressure chamber $62_r$ in response to the first intake valve-side free rocker arm 38 being urged down by the cam lobe 32b of the low lift cam 32, thereby causing the engagement plate portion 71a to be disengaged from the engagement groove $66_r$. When the first intake valve free rocker arm 38 starts to be brought into sliding contact with the base-circle portion 32a of the low lift cam 32, causing the axes of the urging pin $57_r$ and the switch-over pin $59_r$ to be aligned with each other, the switch-over pin $59_r$ is moved to the position in which it is located across the boundary between the rocker arms 36 and 38 by the spring force of the return spring $61_r$, thereby connecting the rocker arms 36 and 38 to each other.

The second intake valve operating/stoppage switch-over means $53_2$ provided between the second intake valve driving rocker arm 37 and the second intake valve free rocker arm 39 has basically the same construction as the above-described first intake valve operating/stoppage switch-over means $53_1$, and the trigger mechanism $70_2$ provided with the second intake valve operating/stoppage switch-over means $53_2$ also has basically the same construction as the above-described trigger mechanism $70_1$. Therefore, the detailed description of the constructions of the second intake valve operating/stoppage switch-over means $53_2$ and the trigger mechanism $70_2$ is omitted. The second intake valve operating/stoppage switch-over means $53_2$ is operated for switching-over of the connection and disconnection synchronously with the first intake valve operating/stoppage switch-over means $53_1$ in such a manner that when the first intake valve operating/stoppage switch-over means $53_1$ disconnects the first intake driving rocker arm 36 and the first intake valve free rocker arm 38 from each other, the second intake valve-side valve operating/stoppage switch-over means $53_2$ disconnects the second intake valve driving rocker arm 37 and the second intake valve free rocker arm 39 from each other, and when the first intake valve operating/stoppage switch-over means $53_1$ connects the first intake valve driving rocker arm 36 and the first intake valve free rocker arm 38 to each other, the second intake valve operating/stoppage switch-over means $53_2$ connects the second intake valve driving rocker arm 37 and the second intake valve free rocker arm 39 to each other.

Referring to FIG. 5, the connection switch-over means 54 provided in the first intake valve driving rocker arm 36, the second intake valve driving rocker arm 37 and the second intake valve free rocker arm 39 includes a switch-over piston 76 capable of switching over the connection and disconnection of the first intake valve driving rocker arm 36 and the second intake valve free rocker arm 39, a switch-over pin 77 capable of switching over the connection and disconnection of the second intake valve free rocker arm 39 and the second intake valve driving rocker arm 37, a limiting member 78 provided in sliding contact with the switch-over pin 77 on the opposite side from the switch-over piston 76, and a return spring 79 for biasing the limiting member 78 toward the switch-over pin 77.

The switch-over piston 76 is slidably received in the first intake valve driving rocker arm 36, so that it can be fitted into the second intake valve free rocker arm 39. A hydraulic pressure chamber 80 is defined between one end of the switch-over piston 76 and the first intake valve driving rocker arm 36. A communication passage 81 is provided in the first intake valve driving rocker arm 36 to lead to the hydraulic pressure chamber 80, and an oil passage 82 is provided within the intake valve rocker arm shaft 40 independently from the first and second intake valve operating/stoppage switch-over means $53_1$ and $53_2$ to normally lead to the communication passage 81. Thus, the connection switch-over means 54 is operable for switching-over independently from the first and second intake valve operating/stoppage switch-over means $53_1$ and $53_2$.

The switch-over pin 77 is slidably received in the second intake valve free rocker arm 39, so that it can be fitted into the second intake valve driving rocker arm 37. One end of the switch-over pin 77 abuts against the other end of the switch-over piston 76.

The limiting member 78 is in the form of a bottomed cylindrical shape and is slidably received in the second intake valve driving rocker arm 37. A closed end of the limiting member 78 abuts against the other end of the switch-over pin 77. A retaining ring 83 is fitted in the second intake valve driving rocker arm 37 and is adapted to abut against a collar 78a provided at an open end of the limiting member 78 to inhibit the movement of the limiting member 78. The return spring 79 is mounted under compression between the limiting member 78 and the second intake valve driving rocker arm 37.

In the connection switch-over means 54, when no hydraulic pressure is applied to the hydraulic pressure chamber 80, the abutting faces of the switch-over piston 76 and the switch-over pin 77 are located between the first intake valve driving rocker arm 36 and the second intake valve free rocker arm 39, and the abutting faces of the switch-over pin 77 and the limiting member 78 are located between the second intake valve free rocker arm 39 and the second intake valve driving rocker arm 37. Therefore, the rocker arms 36, 37 and 39 are in their disconnected states. When a hydraulic pressure is applied to the hydraulic pressure chamber 80, the switch-over piston 76 is moved to a position in which the other end thereof is fitted into the second intake valve free rocker arm 39, and the switch-over pin 77 is moved to a position in which the other end thereof is fitted into the second intake valve driving rocker arm 37, thereby connecting the rocker arms 36, 37 and 39 to one another.

Figure 6:
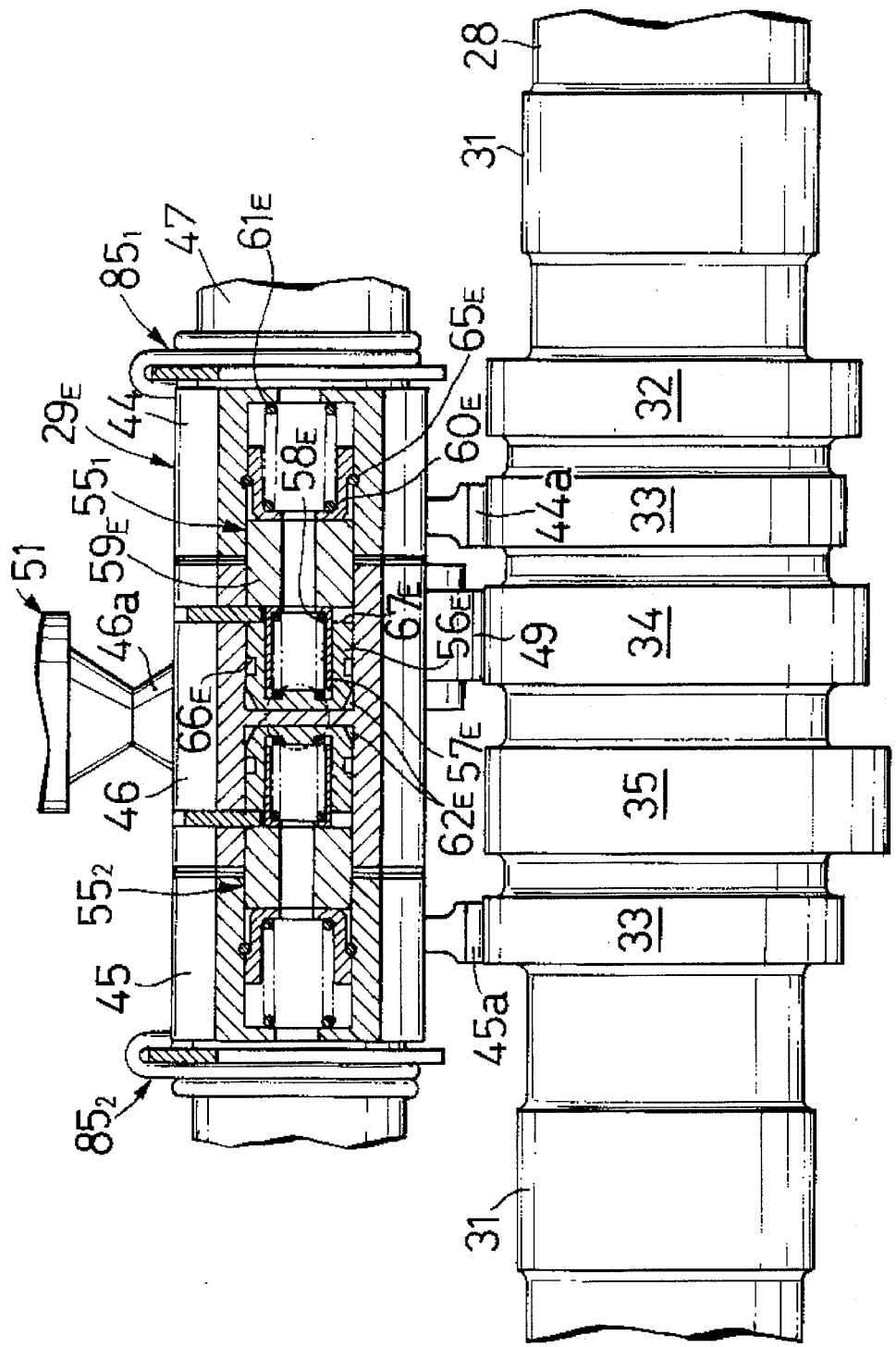

Referring to FIG. 6, the first exhaust valve driving rocker arm 44 and exhaust valve free rocker arm 46 in the exhaust valve driving device $29_E$ are provided with a first exhaust valve operating/stopping switch-over means $55_1$. The second exhaust valve driving rocker arm 45 and the exhaust valve free rocker arm 46 are provided with a second exhaust valve operating/stopping switch-over means $55_2$. The first and second exhaust valve operating/stopping switch-over means $55_1$ and $55_2$ have basically the same constructions as the first and second intake valve operating/stopping switch-over means $53_1$ and $53_2$ of the intake valve driving device $29_E$. Therefore, a subscript E is added in the drawings to the essential portions of the first and second intake valve operating/stopping switch-over means $53_1$ and $53_2$, and the detailed description thereof is omitted.

However, the hydraulic pressure chamber $62_E$ of each of the first and second exhaust valve operating/stopping switch-over means $55_1$ and $55_2$ is provided in the exhaust valve free rocker arm 46, and the hydraulic passage 84 provided in the exhaust valve rocker arm shaft 47 is communicated with both the hydraulic chambers $62_r$. Thus, both the first and second exhaust valve operating/stopping switch-over means $55_1$ and $55_2$ are constructed so that they are switched over synchronously with each other between connecting states attained upon releasing the hydraulic pressure in the oil passage 84 provided within the exhaust valve rocker arm shaft 47 and the disconnecting states attained upon application of the hydraulic pressure to the oil passage 84. Trigger mechanisms $85_1$ and $85_2$ having basically the same constructions as the above-described trigger mechanisms $70_1$ and $70_2$ are mounted to the first exhaust valve operating/stoppage switch-over means $55_1$ and $55_2$, respectively.

Spring load of the return springs $61_E$ of the first and second exhaust valve operating/stopping switch-over means $55_1$ and $55_2$ are set larger than those of the return springs $61_1$ of the first and second intake valve operating/stopping switch-over means $53_1$ and $53_2$.

Figure 7:
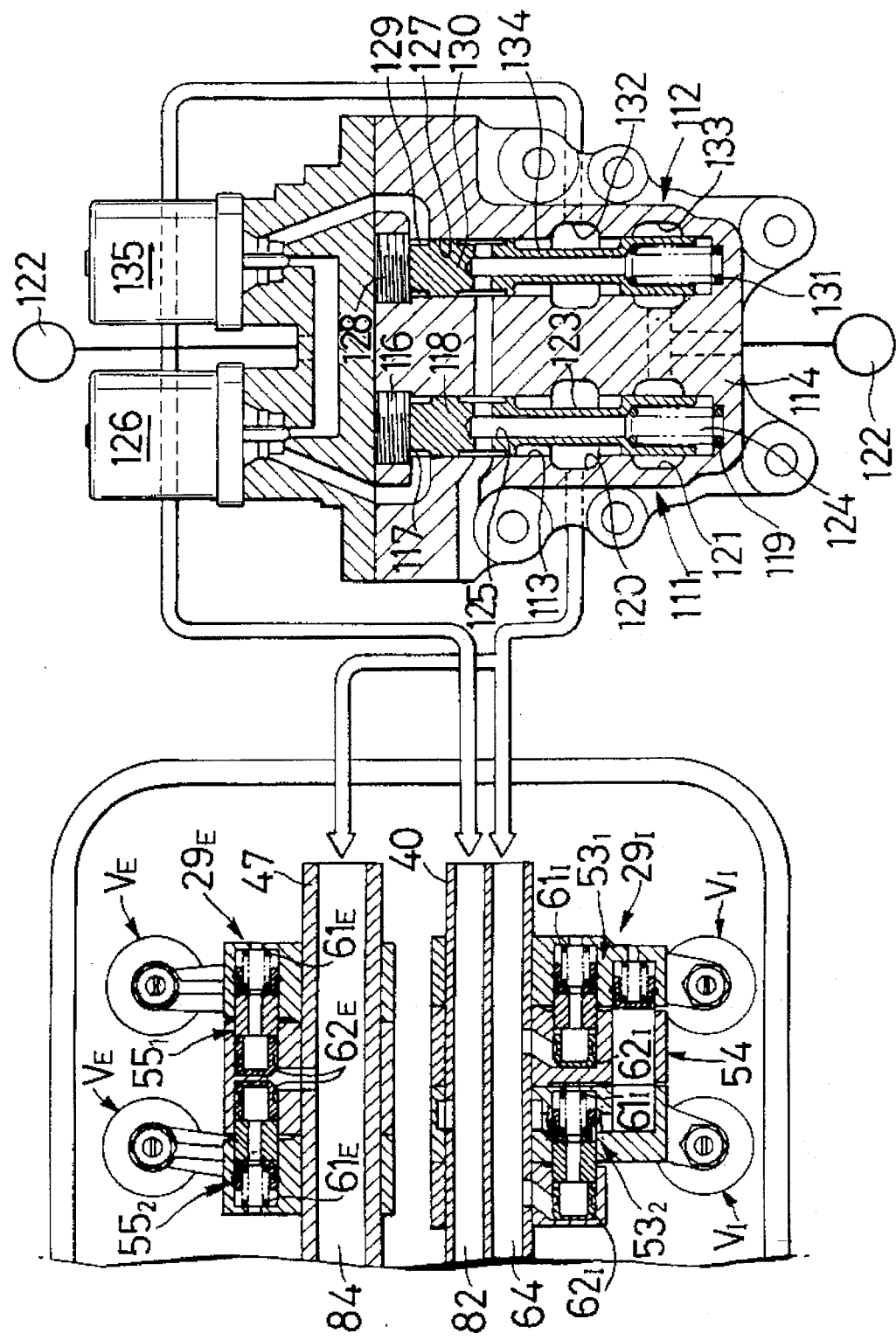

In FIG. 7, the oil passage 64 leading to the hydraulic pressure chambers $62_I$, and $62_r$ of the first and second intake valve operating/stopping switch-over means $53_1$ and $53_2$ of the intake valve driving device $29_1$ and the oil passage 84 leading to the hydraulic pressure chambers $62_E$, $62_E$ of the first and second exhaust valve operating/stopping switch-over means $55_1$ and $55_2$ of the exhaust valve driving device $29_E$ are commonly connected to a hydraulic pressure control valve $111_1$. the oil passage 82 leading to a hydraulic pressure chamber 80 of the connecting switch-over means 54 in the intake valve driving device $29_1$ is connected to a hydraulic pressure control valve 112.

The hydraulic pressure control valve $111_1$ includes: a valve housing 114 having a bottomed sliding hole 113 with one end opened; a valve spool 118 slidably fitted to the sliding hole 113 so as to form a pilot chamber 117 between the valve spool 118 itself and lid 116 which is secured to the valve housing so as to close the opened end of the sliding hole 113; and a spring 119 compressed between the other closed end of the sliding hole 113 and the valve spool 118 for exhibiting a spring force in a direction to reduce the volume of the pilot chamber 117.

An output annular groove 120 commonly leading to the oil passages 64 and 84, and an input annular groove 121 leading to the hydraulic pressure source 122 are provided in an inner surface of the sliding hole 113 at a distance apart in the axially direction. As shown in FIG. 7, the valve spool 118 is provided at its outer surface with an annular recess 123 for communicating the annular grooves 120 and 121 with each other when the valve spool 118 moves from a position in which a volume of the pilot chamber 117 becomes minimum to a position in which the volume of the pilot chamber 117 becomes maximum. The spring 119 is accommodated in a spring chamber 124 formed between the other closed end of the sliding hole 113 and the valve spool 118. The valve spool 118 is coaxially provided with an atmosphere opening passage 125 for opening the spring chamber 124 to the atmosphere.

A hydraulic pressure source 122 is connected to the pilot chamber 117 through a solenoid on-off valve 126 mounted to the valve housing 114. When a hydraulic pressure from the hydraulic pressure source 122 is applied to the pilot chamber 117 by the solenoid on-off valve 126, the valve spool 118 is moved against the spring force of spring 119 to a position in which the input annular groove 121 is communicated with the output annular groove 120, thereby simultaneously applying the hydraulic pressure from the hydraulic pressure source 122 to both the oil passages 64 and 84.

The hydraulic pressure control valve 112 has basically the same construction as that of the hydraulic pressure valve $111_1$, and includes a valve housing 114 which corresponds to the hydraulic pressure control valve $111_1$, a valve spool 130 slidably fitted into a bottomed sliding hole 127 provided in the valve housing 114 for forming a pilot chamber 129 between the valve spool 130 itself and a lid 128 which closes one open end of the bottomed sliding hole 127, and a spring 113 compressed between the other closed portion of the sliding hole 127 and the valve spool 130.

An output annular groove 132 leading to the oil passage 82, and an input annular groove 133 leading to the hydraulic pressure source 122 are provided in an inner surface of the sliding hole 127. The valve spool 130 is provided at its outer surface with an annular recess 134 for communicating the annular grooves 132 and 133 with each other when the valve spool 130 is moved to a position in which a volume of the pilot chamber 129 becomes maximum.

A hydraulic pressure source 122 is connected to the pilot chamber 129 through a solenoid on-off valve 135 mounted to the valve housing 114. When a hydraulic pressure from the hydraulic pressure source 122 is applied to the pilot chamber 129 by the solenoid on-off valve 135, the valve spool 130 is moved against the spring force of spring 131 to a position in which the input annular groove 133 is communicated with the output annular groove 132, thereby applying the hydraulic pressure from the hydraulic pressure source 122 to the oil passage 82.

The operation of the first embodiment now will be described. When the first intake valve operating/stopping switch-over means $53_1$, second intake valve operating/stopping switch-over means $53_2$, the connection switch-over means 54, and first and second exhaust valve operating/stopping switch-over means $55_1$ and $55_2$ all are brought into the disconnecting states during operation of the engine, the first and second intake valve driving rocker arms 36 and 37, as well as the first exhaust valve driving rocker arm 44 and second exhaust valve driving rocker arm 45 are in the stopped states, and both the intake valves $V_1$, $V_1$ and both the exhaust valves $V_E$, $V_E$ are closed and stopped, thereby providing the non-operating or stopped state of the cylinder.

In order to bring the first and second intake valve operating/stopping switch-over means $53_1$ and $53_2$, as well as first and second exhaust valve operating/stopping switch-over means $55_1$ and $55_2$ into the above-described disconnecting states from their connected states it is necessary to apply the hydraulic pressure to their hydraulic pressure chambers $62_I$ and $62_E$. Therefore, the oil passages 64 and 84 leading to the hydraulic pressure chamber $62_I$ and $62_E$ are brought into communication with the hydraulic pressure source 122. However, the spring load of the return springs $61_E$ in the first and second exhaust valve operating/stopping switch-over means $55_1$ and $55_2$ are set larger than those of the return springs $61_I$ of the first intake valve operating/ stopping switch-over means $53_1$ and second intake valve operating/stopping switch-over means $53_2$. Therefore, even if the hydraulic pressures are simultaneously applied to both the oil passage 64 and 84, i.e., to both the hydraulic pressure chambers $62_I$ and $62_z$, the first and second intake valve operating/stopping switch-over means $53_1$ and $53_2$ are operated to their disconnecting states first and then, the first and second exhaust valve operating/stopping switch-over means $55_1$ and $55_2$ are operated to their disconnecting states later.

Therefore, in bringing the cylinder into the non-operating stopped state, it is possible to perform, by the single hydraulic pressure control valve $111_1$, a stop control such that the stopping of the intake valve $V_I$, $V_I$ precedes the stopping of the exhaust valve $V_E$, $V_E$ in stopping the cylinder, in order to avoid having combustion gas remaining within the stopped cylinder. Further, since such a stop control can be performed by the single hydraulic pressure control valve $111_1$, it is possible to decrease the number of parts and to reduce the space required for disposition of the hydraulic pressure control valve $111_1$.

Next, if the hydraulic pressures of the hydraulic pressure chambers $62_I$ and $62_E$ are release by the hydraulic pressure control valve $111_1$ while maintaining the connection switch-over means 54 of the intake valve driving device $29_I$ in the disconnecting state, the first and second exhaust valve operating/stopping switch-over means $55_1$ and $55_2$ are first connected and then the first and second intake valve operating/stopping switch-over means $53_1$ and $53_2$ are connected later. Thus, the first intake valve driving rocker arm 36 is connected to the first intake valve free rocker arm 38, the second intake valve driving rocker arm 37 is connected to the second intake valve free rocker arm 39, and the first and second exhaust driving rocker arms 44 and 45 are connected to the exhaust valve free rocker arm 46. Therefore, because the first intake free rocker arm 38 is brought into the lowlift substantially stopped state by the low lift cam 32, one of the intake valves $V_I$ remains substantially closed and stopped by the low lift cam 32 whereas, the other intake valve $V_I$ is opened and closed in accordance with a characteristic corresponding to the profile of the intake valve operating cam 35, and both the exhaust valves $V_E$ are opened and closed in accordance with a characteristic corresponding to the profile of the exhaust side operating cam 34. Therefore, in a condition in which the one intake valve $V_I$ is in the substantially stopped (low lift) state, a swirl can be produced within the combustion chamber 13 in response to the other intake valve $V_I$ being opened and closed, thereby enhancing the fuel combustibility, performing the circulation of a large amount of exhaust gas and the lean combustion in a range of low speed of the engine to provide a reduction in specific fuel consumption and an enhancement in drivability.

Further, in the intake valve driving device $29_I$, if the connection switch-over means 54 is operated, while maintaining the first and second intake valve operating/stopping switch-over means $53_1$ and $53_2$, as well as the first and second exhaust valve operating/stopping switch-over means $55_1$ and $55_2$ in their connecting states, the first and the second intake valve driving rocker arms 36 and 37 are connected to the second intake valve free rocker arm 39, and the first and second exhaust valve driving rocker arms 44 and 45 and exhaust valve free rocker arm 46 are kept connected. Therefore, by driving the second intake valve free rocker arm 39 by the intake valve operating cam 35, both the intake valves $V_I$, $V_I$ are opened and closed in accordance with the characteristic corresponding to the profile of the intake valve operating cam 35 and both the exhaust valves VE, VE are opened and closed in accordance with the characteristic corresponding to the profile of exhaust valve operating cam 34.

FIGS. 8 to 12 illustrate a second embodiment of the present invention, wherein portions or components corresponding to those in the first embodiment are designated by the same reference characters or like reference characters with a subscript 2.

Figure 8:
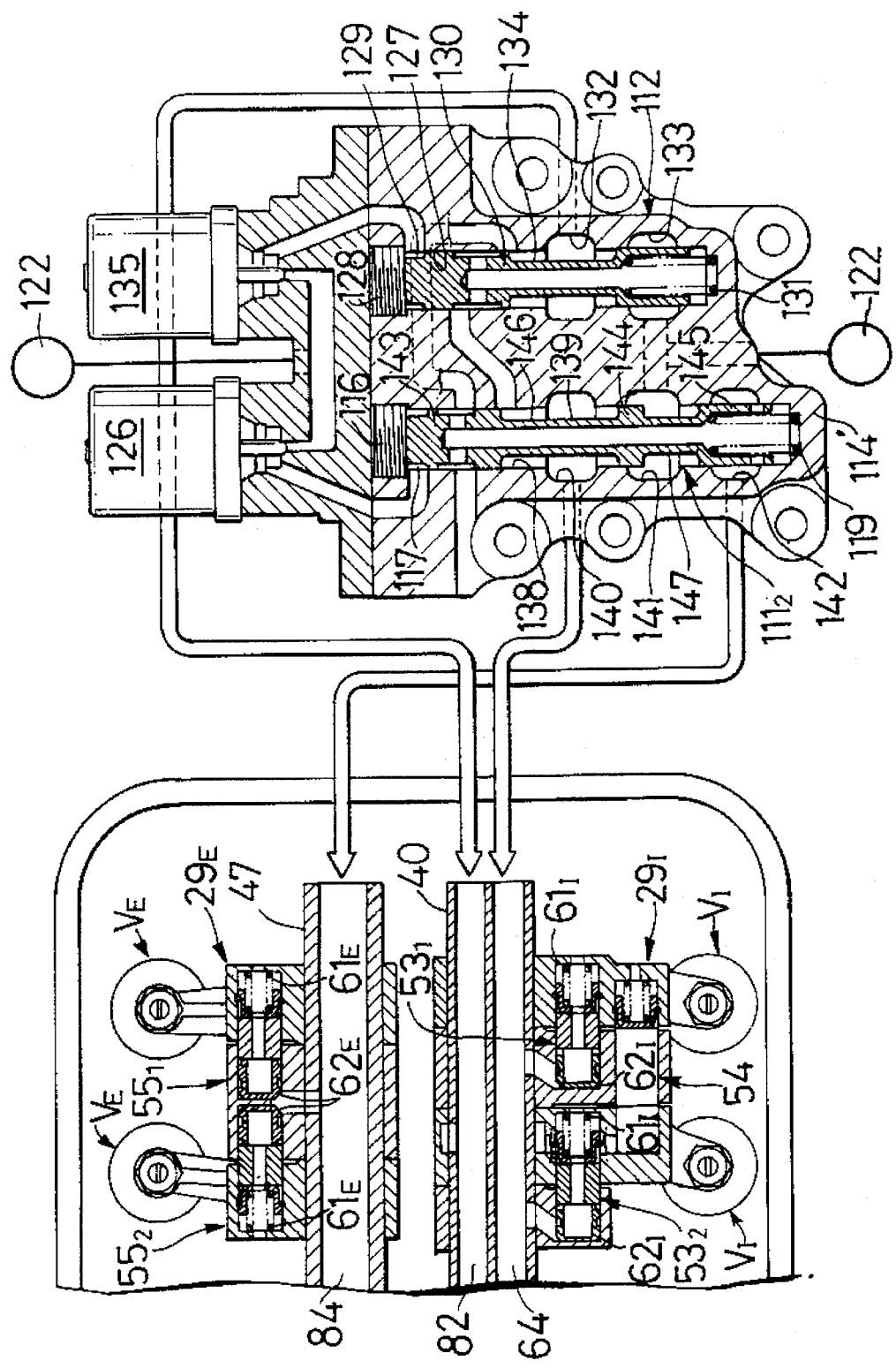

Referring first to FIG. 8, the spring load of the return spring $61_I$ in intake valve operating/stopping switch-over means $53_1$ and $53_2$ of the intake valve driving device $29_I$ and the spring load of a return spring $61_E$ in exhaust valve operating/stopping switch-over means $55_1$ and $55_2$ of the intake valve driving device $29_E$ are set equally to each other. An oil passage 64 leading to hydraulic chambers $62_I$ in the intake valve operating/stopping switch-over means $53_1$ and $53_2$ and an oil passage 84 leading to hydraulic chamber $63_E$ in the exhaust valve operating/stopping switch-over means $55_1$ and $55_2$ are connected to a common hydraulic pressure control valve $111_2$, and an oil passage 82 leading to a hydraulic chamber 80 in the connection switch-over means 54 in the intake valve driving device $29_I$ is connected to a hydraulic pressure control valve 112.

Figure 9:
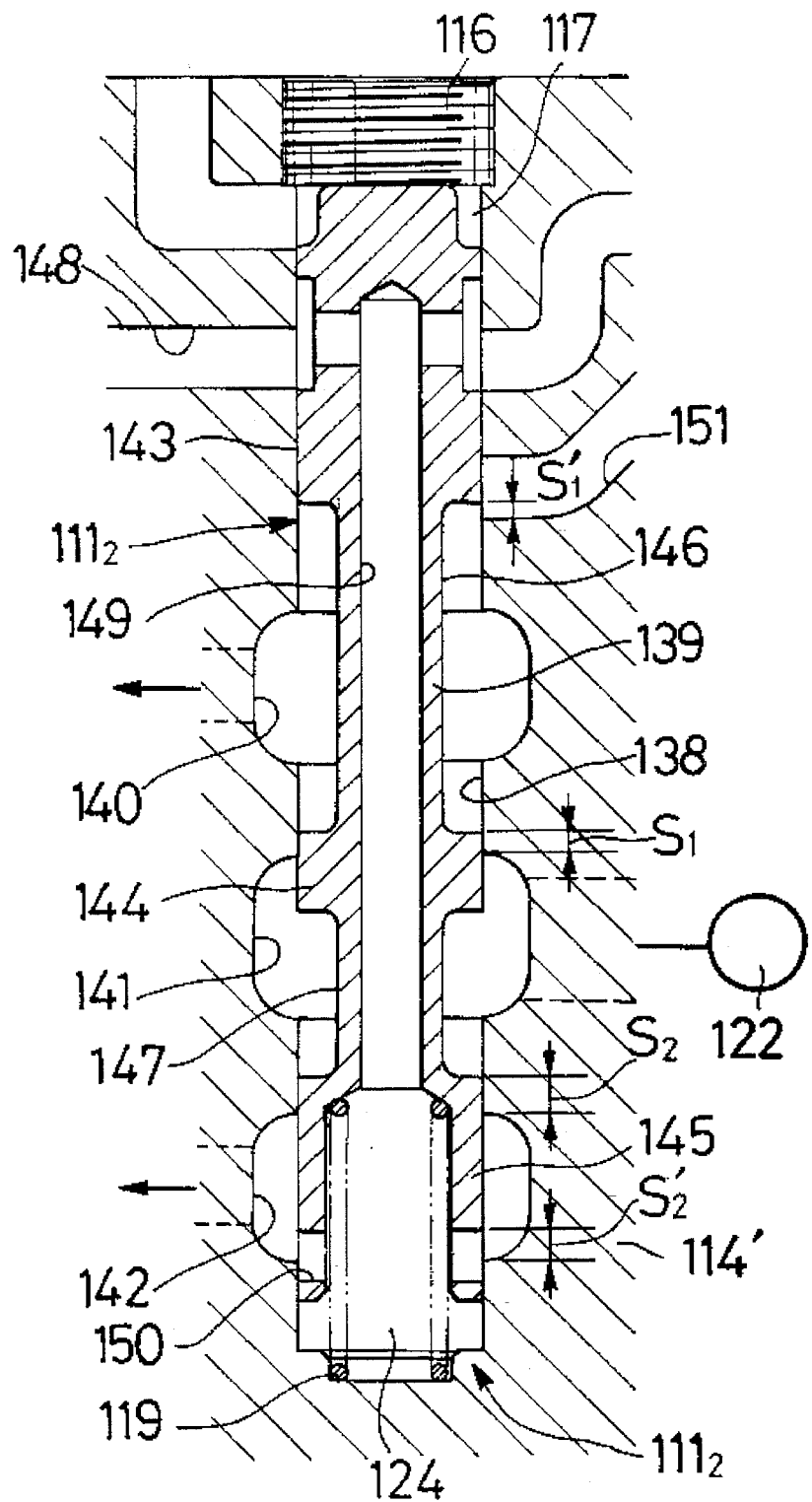

Referring also to FIG. 9, the hydraulic pressure control valve $111_2$ includes a valve housing 114' having a bottomed slide hole 138 with one end open, a valve spool 139 slidably received in the slide hole 138 to define a pilot chamber 117 between the spool and a plug 116 which is fixed to the valve housing 114' to close the opening in the one end of the slide hole 138, and a spring 119 mounted under compression between the closed end of the slide hole 138 and the valve spool 139 to exhibit a spring force in a direction to decrease the volume of the pilot chamber 117.

A first output annular groove 140 leading to the oil passage 64, an input annular groove 141 leading to a hydraulic pressure source 122 and a second output annular groove 142 leading to the oil passage 84 are provided at an axial distance from each other in an inner surface of the slide hole 138. The valve spool 139 includes, on its outer surface, a first land portion 143 which is in sliding contact with the inner surface of the slide hole 138 one axiall end of the valve spool 139, a second land portion 144 which is in sliding contact with the inner surface of the slide hole 138 at an axially intermediate portion of the valve spool, and a third land portion 145 which is in sliding contact with the inner surface of the slide hole 138 at the other axial end of the valve spool. A first annular recess 146 is defined between the first and second land portions 143 and 144, and a second annular recess 147 is defined between the second and third land portions 144 and 145.

An opening passage 149 is coaxially provided in the valve spool 139 for permitting a spring chamber 125 defined between the other closed end of the slide hole 138 and the valve spool 139 and accommodating the spring 119 therein to be normally put into communication with an atmosphere opening passage 148 which is provided in the valve housing 114' to open to the atmosphere. A plurality of radial opening holes 150 are provided at circumferentially spaced-apart locations in the third land portion 145 of the valve spool 139 for permitting the spring chamber 124 to lead to the second output annular groove 142 in a condition in which the valve spool 139 is in a position to minimize the volume of the pilot chamber 117, as shown in FIG. 9. Further, an atmosphere opening passage 151 is provided in the valve housing 114' and opens into the inner surface of the slide hole 138 to lead to the first annular recess 146 in a condition in which the valve spool 139 is in a position to minimize the volume of the pilot chamber 117. The atmosphere opening passage 151 opens to the atmosphere.

The second land portion 144 is provided to cut off the communication between the input annular groove 141 and the first output annular groove 140, when the valve spool 139 is in a state in which it has been moved to the maximum toward the pilot chamber 117, as shown in FIG. 9, and to permit the input annular groove 141 and the first output annular groove 140 to be put into communication with each other, when the valve spool 139 has been moved by a stroke amount $S_1$ (e.g., 2.0 mm) in a direction to increase the volume of the pilot chamber 117 from the position to which it has been moved to the maximum toward the pilot chamber 117. The third land portion 145 is provided to cut off the communication between the input annular groove 141 and the second output annular groove 142 when the valve spool 139 is in a state in which it has been moved to the maximum toward the pilot chamber 117, and to permit the input annular groove 141 and the second output annular groove 142 to be put into communication with each other, when the valve spool 139 has been moved by a stroke amount $S_2$ (e.g., 2.5 mm) larger than the stroke amount $S_1$ in a direction to increase the volume of the pilot chamber 117 from the position to which it has been moved to the maximum toward the pilot chamber 117. Thus, when the valve spool 139 is moved by the stroke amount $S_1$ in the direction to increase the volume of the pilot chamber 117 from the position to which it has been moved to the maximum toward the pilot chamber 117, the input annular groove 141 and the first output annular groove 140 are put into communication with each other. When the valve spool 139 is then moved by an additional amount $(S_2-S_1)$, the input annular groove 141 and the second output annular groove 142 are put into communication with each other.

An amount $S_1'$ of axial superposition between the end of the atmosphere opening passage 151 opening into the slide hole 138 and the first annular recess 146 in a condition in which the valve spool 139 is in the position to which it has been moved to the maximum toward the pilot chamber 117, is set smaller than the stroke amount $S_1$ ($S_1'<S_1$). An amount of $S_2'$ of axial superposition between the opening hole 150 and the second output annular groove 142 in the condition in which the valve spool 139 is in the position to which it has been moved to the maximum toward the pilot chamber 117, is set smaller than the stroke amount $S_2$ ($S_2'<S_2$). Thus, when the valve spool 139 is moved by the stroke amount $S_1$ in the direction to increase the volume of the pilot chamber 117 from the position to which it has been moved to the maximum toward the pilot chamber 117, thereby putting the input annular groove 141 and the first output annular groove 140 into communication with each other, the communication between the first annular recess 146 and the atmosphere opening passage 151 is cut off. When the valve spool 139 is further moved by the amount $(S_2-S_1)$ to put the input annular groove 141 and the second output annular groove 142 into communication with each other, the communication between the opening hole 150 and the second output annular groove 142 is cut off.

The operation of the second embodiment now will be described below. In applying a hydraulic pressure to the hydraulic pressure chambers $62_I$ in the intake valve operating/stopping switch-over means $53_1$ and $53_2$ in the intake valve driving device $29_I$ and to the hydraulic pressure chambers $62_E$ in the exhaust valve operating/stopping switch-over means $55_1$ and $55_2$ in the exhaust valve driving device $29_E$ to bring both of the intake valves $V_I$, $V_I$ and both of the exhaust valves $V_E$, $V_E$ to a cylinder-stopped state, a hydraulic pressure is applied to the pilot chamber 117 in the hydraulic pressure control valve $111_2$ by a solenoid on-off valve 126.

Figure 10:
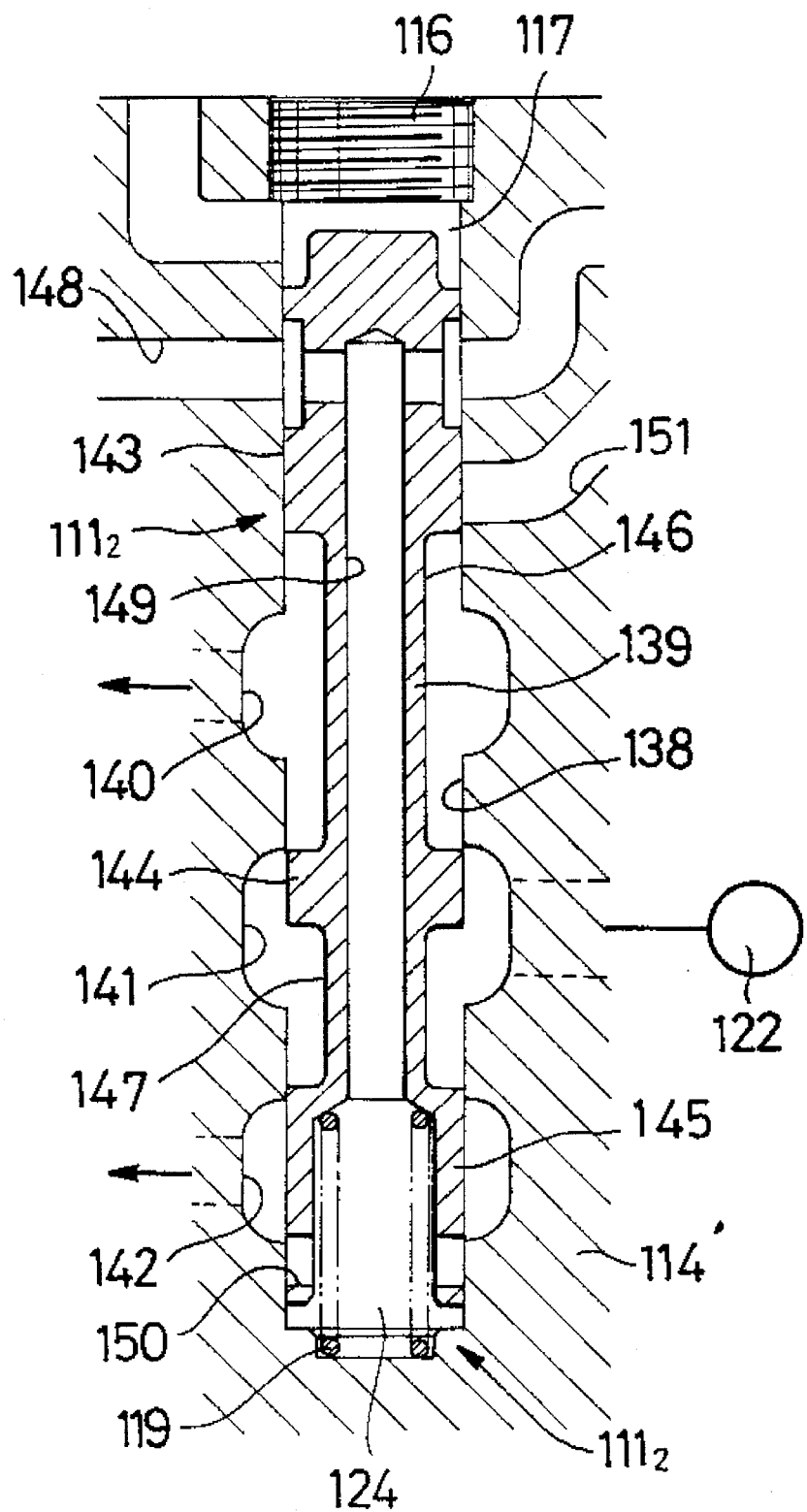

Thus, the valve spool 139 of the hydraulic pressure control valve $111_2$ is first moved from the state shown in FIG. 9 to a position shown in FIG. 10 to put the input annular groove 141 leading to the hydraulic pressure source 122 into communication with the first output annular groove 140. This causes the hydraulic pressure to be first applied to the hydraulic pressure chambers $62_I$ in the intake valve operating/stopping switch-over means $53_1$ and $53_2$, thereby operating the intake valve operating/stopping switch-over means $53_1$ and $53_2$ in a disconnecting direction. Thus, the intake valves $V_I$, $V_I$ are precedently closed and stopped.

Figure 11:
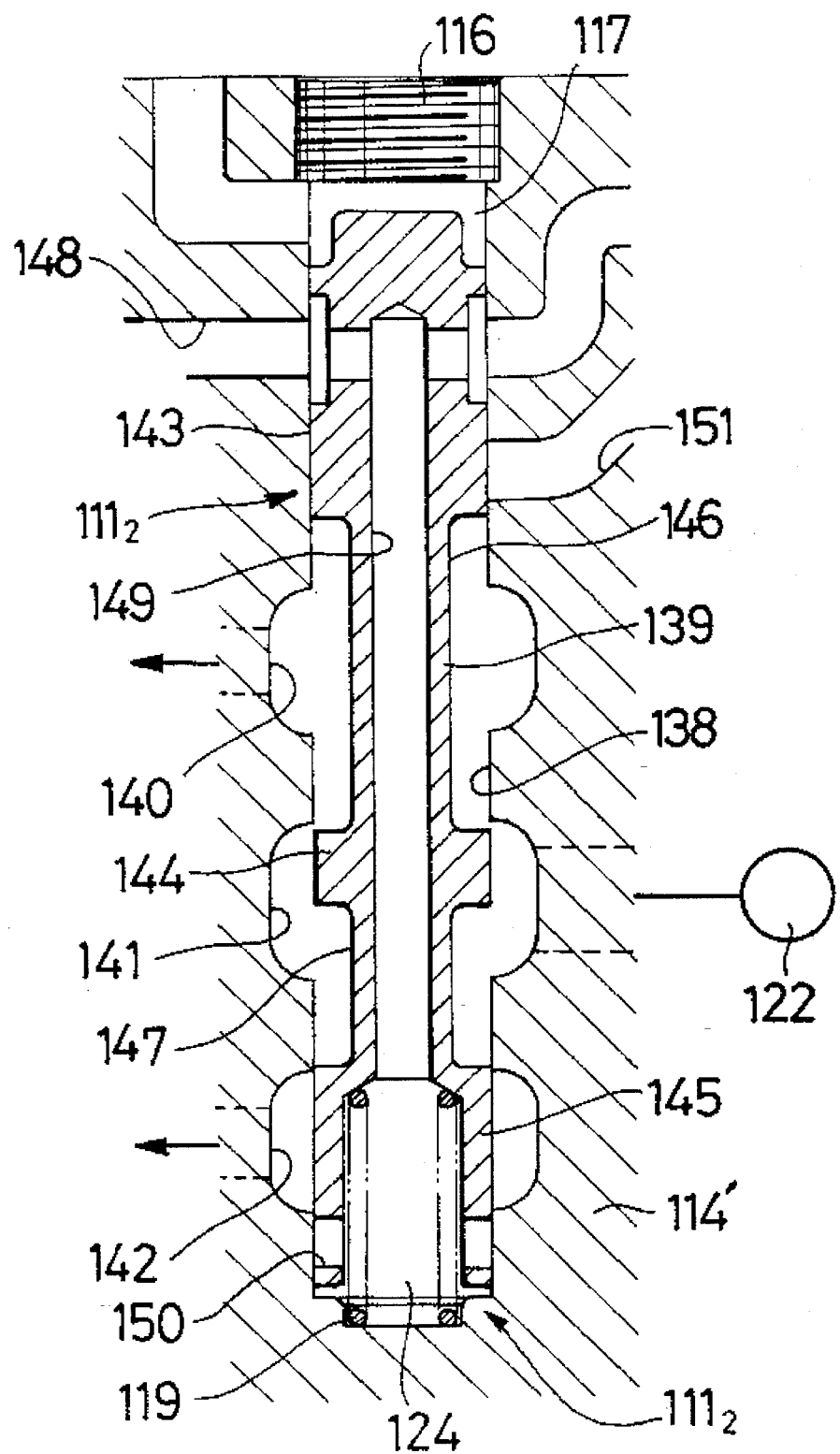
Figure 12:
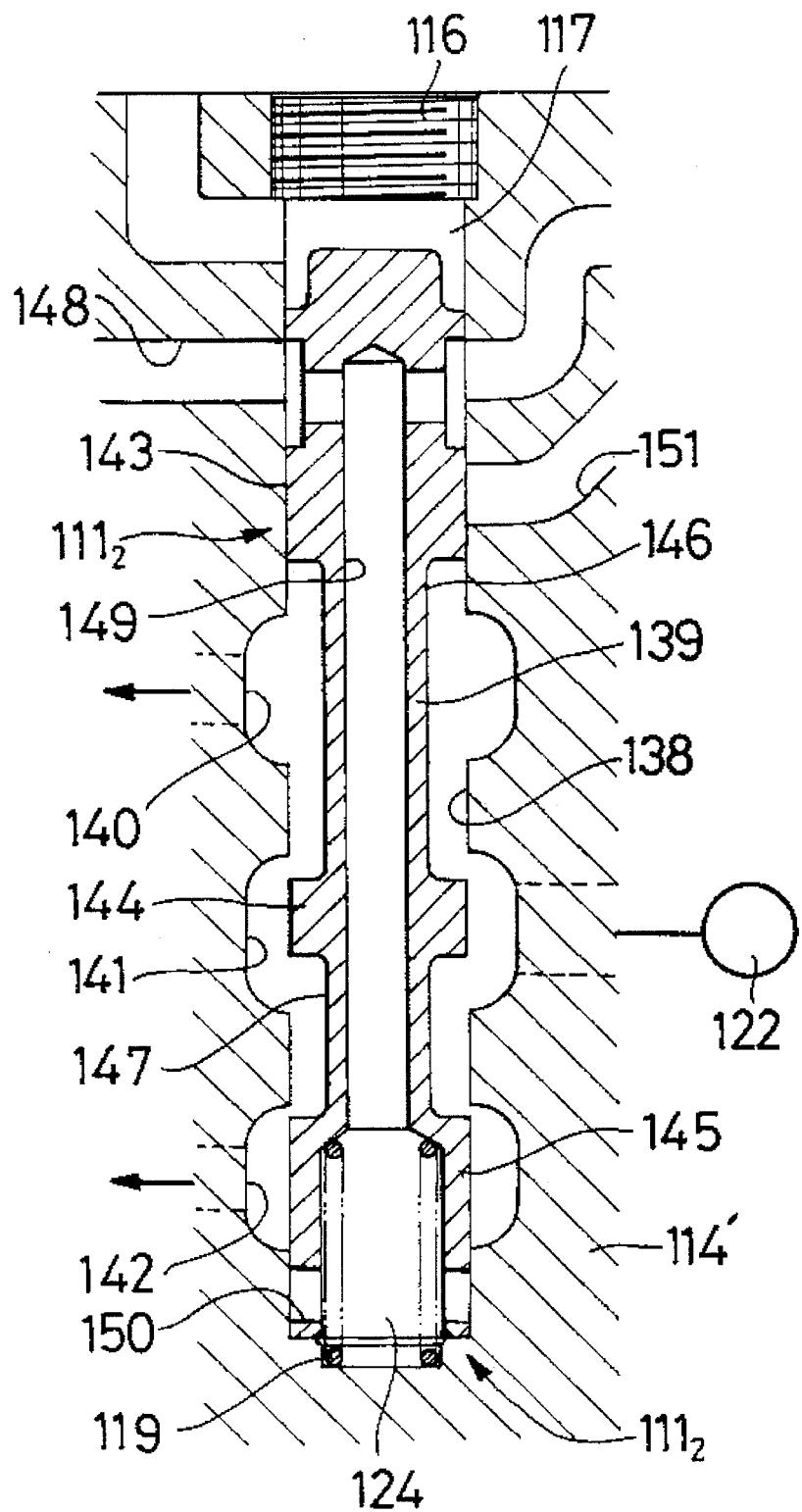

When the stroke amount of the valve spool 139 is larger then S, but smaller than $S_2$, the input annular groove 141 is in communication with the first output annular groove 140 but out of communication with the second output annular groove 142, as shown in FIG. 11. When the valve spool 139 is moved to the position to put the input annular groove 141 into communication with the second output annular groove 142 (i.e., by the stroke amount $S_2$), as shown in FIG.12, the hydraulic pressure is applied to the hydraulic pressure chambers $62_E$ in the exhaust valve operating/stopping switch-over means $55_1$ and $55_2$ to operate the exhaust valve operating/stopping switch-over means $55_1$ and $55_2$ in a disconnecting direction. Thus, the exhaust valves $V_E$, $V_E$ are closed and stopped after the intake valves $V_I$, $V_I$.

In this manner, the hydraulic pressure control valve $111_2$ connected commonly to the hydraulic pressure chambers $62_I$ and $62_E$ in the intake valve and exhaust valve operating/stopping switch-over means $53_1$, $53_2$, $55_1$ and $55_2$ causes the hydraulic pressure to be first applied to the hydraulic pressure chambers $62_I$ in the intake valve operating/stopping switch-over means $53_1$ and $53_2$ in response to the changing of the stroke amount of the valve spool 139 in one direction, and to be then applied with a time lag to the hydraulic pressure chambers $62_E$ in the exhaust valve operating/stopping switch-over means $55_1$ and $55_2$. Therefore, it is possible to perform, by the single hydraulic pressure control valve $111_2$, a stop control such that the stopping of the intake valves $V_I$, $V_I$ precedes the stopping of the exhaust valves $V_E$, $V_E$ in stopping the cylinder, in order to avoid having combustion gas remain within the stopped cylinder. Thus, it is possible to decrease the number of parts and to reduce the space required for disposition of the hydraulic pressure control valve $111_2$.

Although the embodiments of the present invention have been described in detail, it will be understood that the present invention is not limited to the above-described embodiments, and various modifications in design may be made without departing from the spirit and scope of the invention defined in claims.

For example, it is possible to perform a control such that the stopping of the exhaust valves $V_E$ precedes the stopping of the intake valves $V_I$. Further, the two disclosed embodiments can be combined by using the springs $61_I$ and $61_E$ of different spring forces, as disclosed in the embodiment of FIGS. 1 to 7, in the second embodiment of FIGS. 8 to 11, whereby the stopping of the intake valves $V_I$ prior to the stopping of the exhaust valves $V_E$ is accomplished by either spring force differences or pressure differences, or both.

What is claimed is:

1. A valve operating system in a multi-cylinder internal combustion engine, comprising an intake valve operating switch-over means capable of switching over between an operation and a stoppage of an intake valve, and an exhaust valve operating switch-over means capable of switching over between an operation and a stoppage of an exhaust valve, the intake valve and the exhaust valve operating switch-over means being provided for at least one of a plurality of cylinders, each of the valve operating switch-over means including a hydraulic pressure chamber capable of exhibiting a hydraulic pressure force in one axial direction and a return spring for exhibiting a spring force in the other axial direction for opposing said hydraulic pressure force, so that the operation and the stoppage of said intake and said exhaust valves are capable of being switched over form one to another in response to a control of a hydraulic pressure applied to said hydraulic pressure chambers, wherein said valve operating system further includes a single hydraulic pressure control valve which is connected commonly to said hydraulic pressure chambers in said intake valve and said exhaust valve operating switch-over means, and spring loads of said return springs of said intake valve and said exhaust valve operating switch-over means are set at values different from each other.

2. A valve operating system in a multi-cylinder internal combustion engine, comprising an intake valve operating switch-over means capable of switching over between an operation and a stoppage of an intake valve, and an exhaust valve operating switch-over means capable of switching over between an operation and a stoppage of an exhaust valve, said intake valve and the exhaust valve operating switch-over means being provided for at least one of a plurality of cylinders, each of said valve operating switch-over means including a hydraulic pressure chamber capable of exhibiting a hydraulic pressure force in one axial direction and a return spring for exhibiting a spring force in the other axial direction for opposing said hydraulic pressure force, so that the operation and the stoppage of said intake and said exhaust valves are capable of being switched over from one to another in response to a control of a hydraulic pressure applied to said hydraulic pressure chambers, wherein said hydraulic chambers in said intake valve and said exhaust valve operating switch-over means are connected commonly to a single hydraulic pressure control valve having means for sequentially controlling the hydraulic pressure in each of said hydraulic chambers in response to a changing of a stroke amount of a valve spool of said control valve in one direction.

3. A valve operating system in a multi-cylinder internal combustion engine, comprising an intake valve operating switch-over means capable of switching over between an operation and a stoppage of an intake valve, and an exhaust valve operating switch-over means capable of switching over between an operation and a stoppage of an exhaust valve, the intake valve and the exhaust valve operating switch-over means being provided for at least one of a plurality of cylinders, each of the valve operating switch-over means including a hydraulic pressure chamber for exhibiting a hydraulic pressure force in one axial direction an a return spring for exhibiting a spring force in the other axial direction for opposing said hydraulic pressure force, and the operation and the stoppage of said intake and said exhaust valves being capable of being switched over from the operation to the stoppage in response to a control of a hydraulic pressure applied to said hydraulic pressure chambers, wherein said valve operating system further includes a single hydraulic pressure control valve which is connected commonly to said hydraulic pressure chambers in said intake valve and said exhaust valve operating switch-over means, and means for causing sequential operation of said intake valve and said exhaust valve operation switch-over means.

* * * * *